United States Patent [19]
Lapres

[11] 3,893,425
[45] July 8, 1975

[54] HAIR GROOMING MOTORIZED BRUSH

[76] Inventor: Jean-Claude Lapres, 803 Boucher St., Apt. 1, Montreal, Quebec, Canada

[22] Filed: Nov. 20, 1973

[21] Appl. No.: 417,537

[52] U.S. Cl. .............................................. 119/91
[51] Int. Cl.² ................................... A01K 13/00
[58] Field of Search ........................... 119/91

[56] References Cited
UNITED STATES PATENTS
431,497   7/1890   Walker .................................. 119/91
FOREIGN PATENTS OR APPLICATIONS
472,990   3/1929   Germany
617,436   3/1961   Canada Primary Examiner—Hugh R. Chamblee

[57] ABSTRACT

A motorized brush for grooming hairs of animals, such as cows, horses and dogs, and including a flexible cable drive to allow harmless jamming of the brush and a handle for the brush which is rotatably connected to the cable drive and the sheating thereof to prevent twisting or winding of the cable upon itself and to rotate a shield portion of the handle around the brush to release hairs caught by the latter.

4 Claims, 6 Drawing Figures

HAIR GROOMING MOTORIZED BRUSH

This invention relates to a brush and, more particularly, to a motorized brush of the type adapted to groom the hairs of animals, such as cows, horses, dogs, etc.

A brush of the above type has, for instance, been disclosed and patented in Canadian Pat. No. 617,436, issued on Feb. 20, 1962. The brush according to the embodiment disclosed in the aforementioned patent may give some problem if, for example, the hairs of the tail of an animal get caught therein or if the flexible cable twists or winds upon itself.

It is a general object of the invention to provide a brush of the above-mentioned type which is adapted to avoid the above problems.

It is a more specific object of the invention to provide a hair grooming motorized brush of the above type which is adapted to allow the brush to safely stop upon jamming by hairs, such as by catching of the tail of an animal therein.

It is another more specific object of the invention to provide a hair grooming motorized brush of the above type which includes a flexible cable drive and is adapted to prevent twisting or winding of the cable upon itself.

It is an even more specific object of the invention to provide a hair grooming motorized brush including a flexible cable drive, with a handle rotatable about the cable and the sheathing thereof to prevent twisting of the latter upon itself, and with a friction clutch between the motor and the flexible cable drive to allow harmless jamming of the brush and to release hairs caught by the latter.

The above and other objects and advantages of the invention will be better understood in the light of the following detailed description which is illustrated, by way of example only, in the accompanying drawings, in which.

The illustrated hair grooming brush includes a brush unit 1, a motor unit 2 and a flexible cable drive 3.

Figure 1:
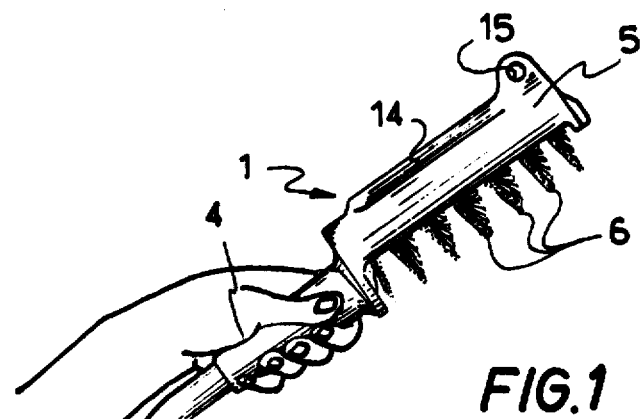
FIG. 1 is a side view of a brush according to the invention operatively held in one's hand.
Figure 2:
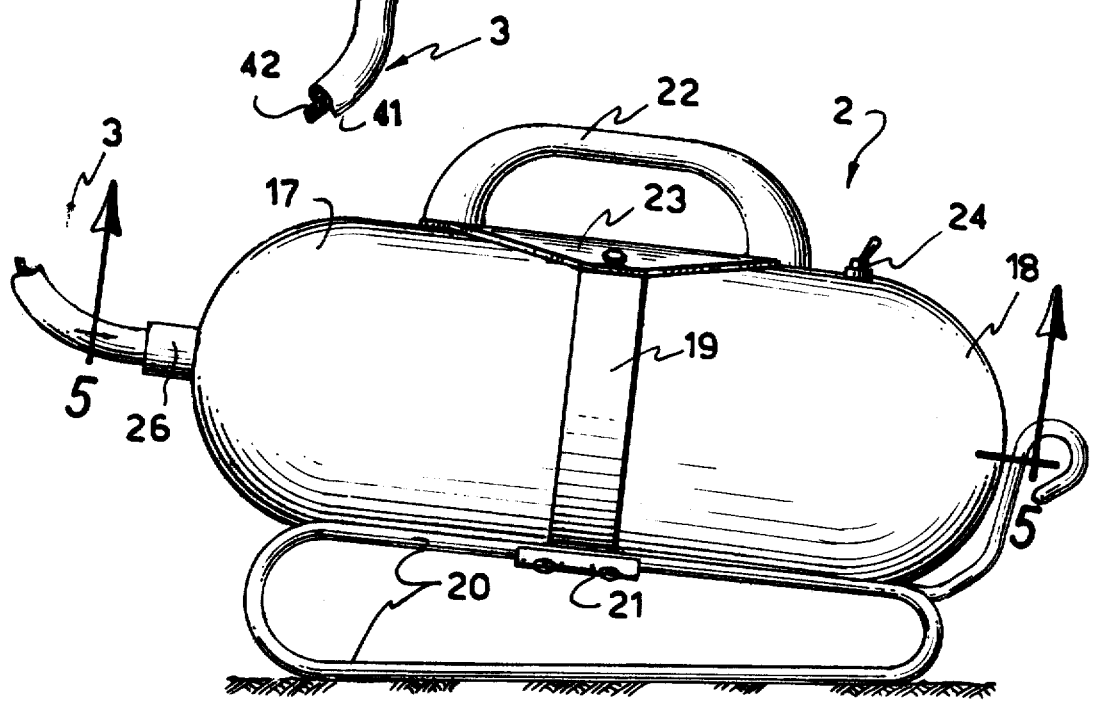
FIG. 2 is a side view of a motor to actuate the brush of FIG. 1.
Figure 3:
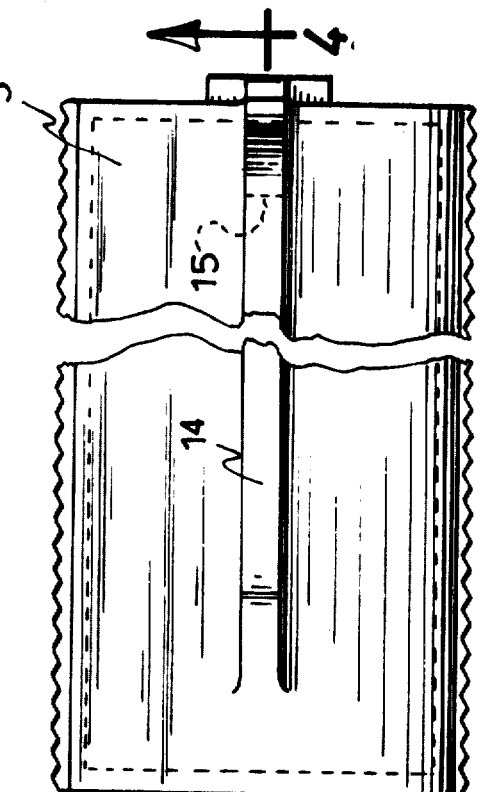
FIG. 3 is a top view of the brush of FIG. 1.
Figure 4:
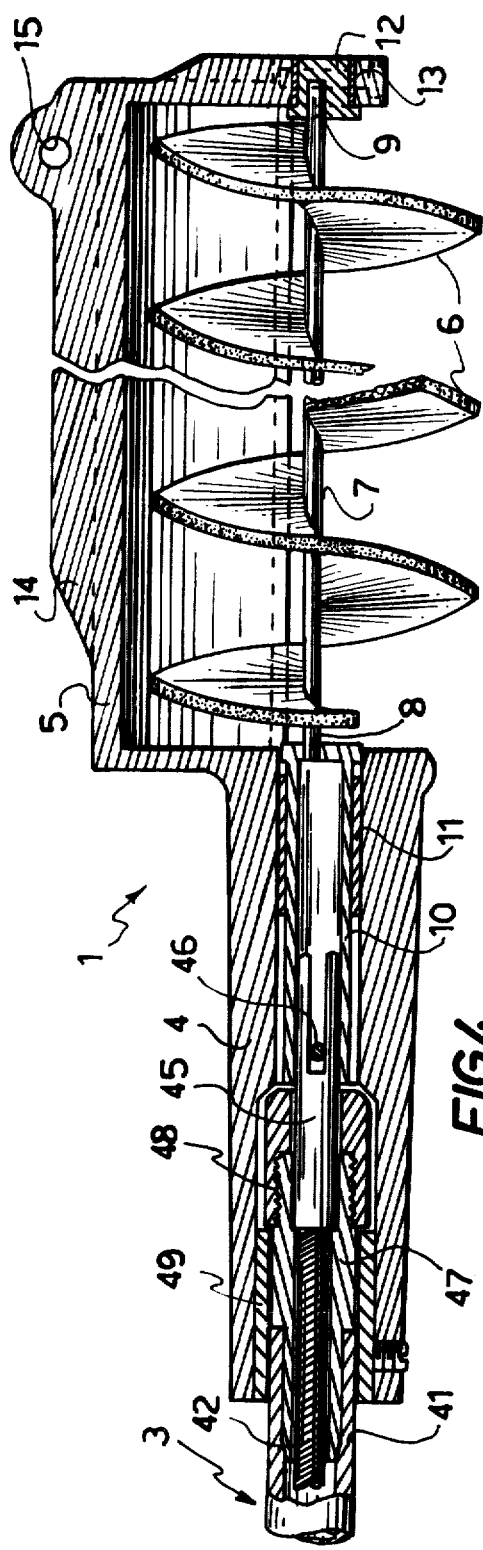
FIG. 4 is a cross-sectional view as seen along line 4—4 in FIG. 3.
Figure 5:
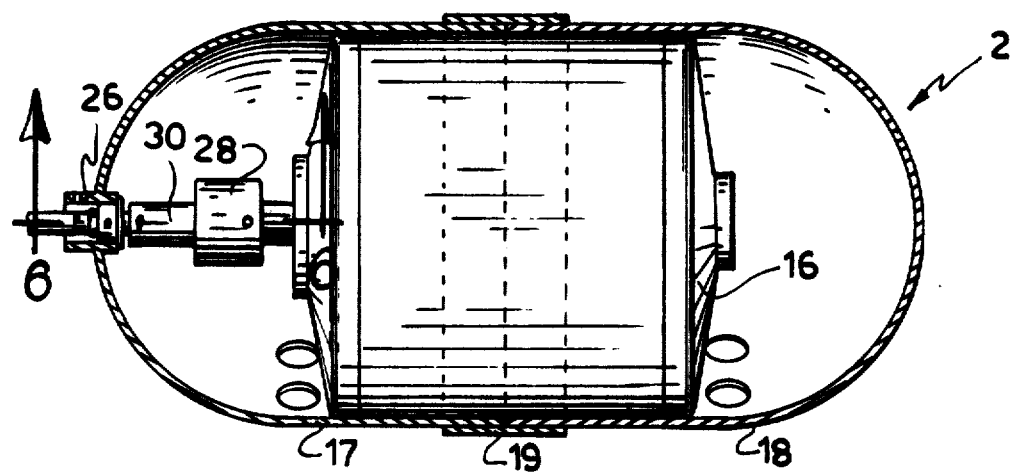
FIG. 5 is a cross-sectional view of the motor assembly as seen along line 5—5 in FIG. 2.
Figure 6:
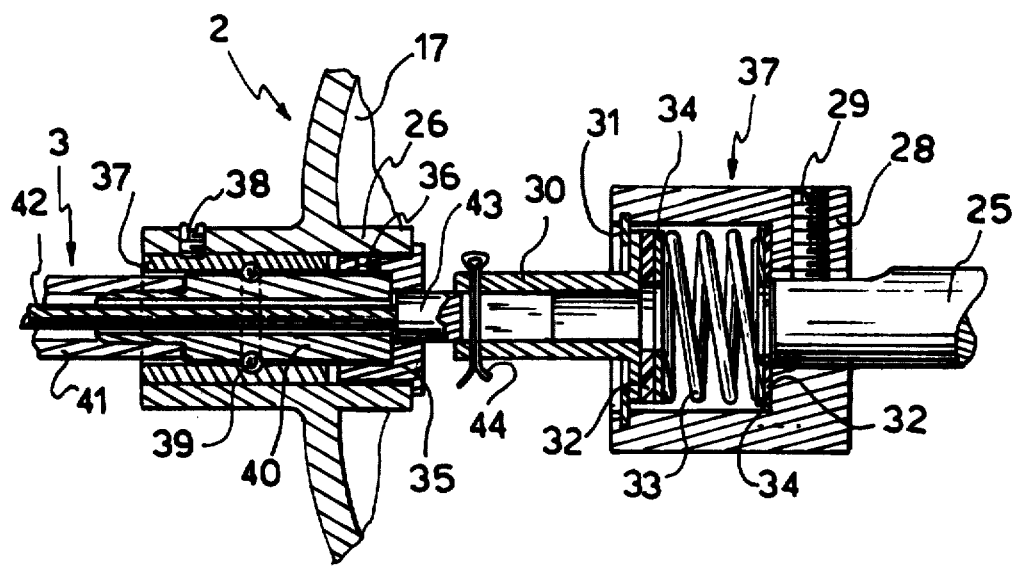
FIG. 6 is a cross-sectional view as seen along line 6—6 in FIG. 5, particularly illustrating the clutch.

The brush unit 1 comprises a handle having a holding portion 4 and a shield portion 5. The holding portion 4 is of tubular form defining an axial bore therethrough. The brush unit 1 also includes a brush of cylindrical shape comprising the bristles 6 secured to a shank portion formed by an axle 7, the opposite ends 8 and 9 of which project axially outwardly from the brushing portion defined by the bristles. The shield portion 5 is shaped to partly circumferentially surround the brush, as best shown in FIGS. 1 and 4. The shield portion 5 is integrally formed with the tubular holding portion 4 and project endwise therefrom.

A hollow cylindrical plug member 10 is rotatably mounted into the bore of the holding portion 4 by a bushing 11. Another plug member 12 is rotatably mounted into the free end of the shield portion 5 by another bushing 13. Both plug members 10 and 12 are axially aligned with the bore into the holding portion 4 of the handle. The opposite ends 8 and 9 of the shank portion or axle 7 are eccentrically secured into the plug members 10 and 12 for eccentric rotation.

A ridge 14 is formed on the outer face of the shield portion 5 and extends longitudinally thereof and a bore 15 extends transversely through the ridge 14 to allow suspension of the brush unit 1 when the brush is not used.

The motor unit 2 includes an electric motor 16 housed into a casing, formed of two halves 17 and 18 circumferentially held together by a ring 19. A tubular support, or stand, 20 is secured by clamping plates 21 under the housing halves 17 and 18 and suitably bent to form runners for the motor unit 2. A handle 22, secured to a mounting plate 23, is secured onto the casing halves for convenience in transporting the whole motorized brush from one site to another. A conventional switch 24 is secured to the casing half 18 to start and stop the motor 16. The latter has an output shaft 25 axially aligned with a sleeve 26 secured to the casing half 17.

A friction clutch 27 includes a casing 28 which is secured to the output shaft 25 by a setscrew 29. A stud 30 is rotatably mounted into the casing 28 by a ring 31. The stud 30 and the casing 28 constitute coupling members defining mutually facing rotary faces against which are positioned friction plates 32. A compression spring 33 is positioned between a pair or rings 34 to bias the latter against the friction plates 32.

A plug 35 is secured into the sleeve 26 by a setscrew 36. A bushing 37 is secured by a setscrew 38 into the sleeve 26 and axially restrains by balls 39 the connecting end 40 of the flexible cable drive 3. The connecting end 40 of the flexible cable drive 3 is secured to the cable sheating 41 and is rotatable therewith into the bushing 37 and the plug 35. The flexible cable 3 also includes the driving cable 42 having a slotted connecting stud 43 rotatably connected to the clutch stud 30 by a cotter pin 44.

The other end of the driving cable 42 also includes a slotted connecting stud 45 rotatably connected to the hollow cylindrical plug member 10 by a pin 46. A sleeve 47, a ferrule 48 and a bushing 49 rotatably hold the cable sheating 41 into the holding portion 4 of the handle.

When the brush is actuated, the friction clutch 27 allows stopping or jamming of the brush and the driving cable 42 without stalling the motor or causing any damage. This clutch is, for instance, adapted to slip under a 10-pound torque.

The swivelling or free rotation of the cable sheathing 41 in the handle of the brush allows to rotate the shield portion around the brush such as to remove hairs twisted around the latter. This swivelling also allows the cable sheathing to freely rotate and avoid twisting of the flexible cable drive.

What I claim is:

1. A hair grooming motorized brush comprising a handle, a brush having a shank portion rotatably mounted in said handle and a brushing portion projecting outwardly from said handle, a motor, a flexible cable drive, said motor driving said brush through said flexible cable drive, said flexible cable drive having an outer tubular sheathing rotatably secured at one end to said handle for rotation of the latter relative to said tubular sheathing, and a friction clutch having a pair of coupling members connected to said flexible drive and to said motor respectively for rotation therewith and relative to each other, friction face means positioned between and in interengagement with said coupling members, spring means biasing said friction face means into said interengagement and one of said coupling members forming an external casing having the other coupling member displaceable therein and enclosing said friction face means and said spring means.

2. A hair grooming motorized brush as defined in claim 1, wherein said other coupling member constitutes a stud rotatably retained in said casing and projecting from one end thereof, said stud and casing having mutually facing rotary faces, said friction face means includes a friction plate positioned adjacent each of said rotary faces, and said spring means constitutes a compression spring biasing said friction plates in spaced-apart relationship and in frictional engagement with said rotary faces.

3. A hair grooming motorized brush as defined in claim 2, wherein said brush has a cylindrical form, coaxial with said shank portion projecting from opposite ends thereof, said handle includes a shield portion circumferentially partly surrounding said brushing portion from end to end thereof.

4. A hair grooming motorized brush as defined in claim 3, further including a first rotary member mounted into said holding portion and connected to said flexible cable to rotate therewith, a second rotary member mounted into said shield portion and coaxially spaced from the latter and the opposite ends of said shank portion eccentrically secured to said first and second rotary members respectively for eccentric rotation of said brush.

* * * * *